(12) United States Patent
Katayama

(10) Patent No.: US 12,481,714 B2
(45) Date of Patent: Nov. 25, 2025

(54) INFORMATION PROCESSING APPARATUS THAT DISPLAYS A SCREEN INCLUDING A CODE IMAGE TO ALLOW AN EXTERNAL APPARATUS TO READ THE CODE IMAGE AND EXECUTE A WEB APPLICATION, INFORMATION PROCESSING METHOD AND STORAGE MEDIUM

(71) Applicant: CANON KABUSHIKI KAISHA, Tokyo (JP)

(72) Inventor: Soichiro Katayama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/895,168

(22) Filed: Aug. 25, 2022

(65) Prior Publication Data

US 2023/0063244 A1    Mar. 2, 2023

(30) Foreign Application Priority Data

Aug. 25, 2021    (JP) .................................. 2021-137498

(51) Int. Cl.
*G06F 3/12*     (2006.01)
*G06F 3/0482*   (2013.01)
(Continued)

(52) U.S. Cl.
CPC ..... *G06F 16/9554* (2019.01); *H04N 1/00925* (2013.01)

(58) Field of Classification Search
CPC .. G06F 16/9554; G06F 16/9566; G06F 16/58; G06F 16/05
See application file for complete search history.

(56) References Cited

U.S. PATENT DOCUMENTS

| 2007/0143861 A1* | 6/2007 | Ohishi | G06F 21/608 726/28 |
| 2010/0128298 A1* | 5/2010 | Matsugashita | G06F 3/1288 358/1.14 |

(Continued)

FOREIGN PATENT DOCUMENTS

| JP | 2002083135 A | 3/2002 |
| JP | 2005018742 A | 1/2005 |

(Continued)

OTHER PUBLICATIONS

Japanese Office Action dated May 20, 2025 in counterpart Japanese Patent Appln. No. 2021-137498.

(Continued)

*Primary Examiner* — Nicholas R Taylor
*Assistant Examiner* — Ho T Shiu
(74) *Attorney, Agent, or Firm* — Venable LLP

(57) ABSTRACT

The present disclosure has an object to provide an information processing apparatus utilizing an image transmitted from a server and displayed on an operation screen of the apparatus's main body. An information processing apparatus includes: reception unit configured to receive notification information from a server system formed by one or more server apparatuses; obtainment unit configured to obtain an image according to identification information, being included in the notification information, for indicating a storage location of the image in the server system; display unit configured to display the image upon triggered by a lapse of a predetermined period or by a particular event; and execution unit configured to execute a function associated with an object in response to an input made by a user with respect to the object included in the image displayed by the display unit.

7 Claims, 10 Drawing Sheets

(51) Int. Cl.
    *G06F 15/00*     (2006.01)
    *G06F 16/955*     (2019.01)
    *H04N 1/00*     (2006.01)

(56) References Cited

U.S. PATENT DOCUMENTS

| | | | |
|---|---|---|---|
| 2011/0164283 A1* | 7/2011 | Sadasue | H04N 1/3875 |
| | | | 358/1.18 |
| 2012/0290412 A1* | 11/2012 | Marovets | G06Q 30/02 |
| | | | 705/14.73 |
| 2016/0044010 A1* | 2/2016 | Yasuhara | H04L 63/062 |
| | | | 713/171 |
| 2016/0371070 A1* | 12/2016 | Jimbo | H04N 1/00066 |
| 2017/0201651 A1* | 7/2017 | Sugiyama | H04N 1/00344 |
| 2017/0262882 A1* | 9/2017 | Shina | G06Q 30/0275 |
| 2019/0199882 A1* | 6/2019 | Han | H04N 1/00244 |
| 2019/0349492 A1* | 11/2019 | Takenaka | G06Q 30/0242 |
| 2019/0361634 A1* | 11/2019 | Inoue | G06F 3/1204 |

FOREIGN PATENT DOCUMENTS

| | | |
|---|---|---|
| JP | 2017-151603 A | 8/2017 |
| JP | 2017204696 A | 11/2017 |
| JP | 2020189436 A | 11/2020 |

OTHER PUBLICATIONS

Japanese Office Action dated Sep. 2, 2025 in counterpart Japanese Patent Appln. No. 2021-137498.

\* cited by examiner

INFORMATION PROCESSING APPARATUS THAT DISPLAYS A SCREEN INCLUDING A CODE IMAGE TO ALLOW AN EXTERNAL APPARATUS TO READ THE CODE IMAGE AND EXECUTE A WEB APPLICATION, INFORMATION PROCESSING METHOD AND STORAGE MEDIUM

BACKGROUND

Field of the Disclosure

The present disclosure relates to an information processing apparatus and an information processing method for displaying content transmitted from a server for a user on a screen.

Description of the Related Art

Conventionally, various kinds of information can be provided to a user by broadcast of content including an advertisement or the like from a server to an information terminal device such as a PC or a smartphone. Japanese Patent Laid-Open No. 2017-151603 describes a technique of providing information to a user by displaying an advertisement from a server on an operation screen of an image forming apparatus.

In recent years, as an image forming apparatus such as an inkjet printer, a copier, or a multifunction machine, there is an information processing system equipped with an Internet browser to run a web application. By operating a web application running on a server via a browser in an image forming apparatus, a user can instruct the image forming apparatus to execute printing, scanning, or the like. The user can thus use anew function that the image forming apparatus does not have.

In a conventional technique, it is possible to display an advertisement on the operation screen of the apparatus main body and print the advertisement displayed. However, it is not possible to put broadcasted information into effective use, such as using a web application via various kinds of content, such as an advertisement, provided by a server.

SUMMARY

The present disclosure has an object to provide an information processing apparatus capable of using various functions by utilizing a content image transmitted from a server and displayed on an operation screen of the apparatus's main body.

One aspect according to an information processing apparatus to achieve above-described object includes: reception unit configured to receive notification information from a server system formed by one or more server apparatuses; obtainment unit configured to obtain an image according to identification information, being included in the notification information, for indicating a storage location of the image in the server system; display unit configured to display the image upon triggered by a lapse of a predetermined period or by a particular event; and execution unit configured to execute a function associated with an object in response to an input made by a user with respect to the object included in the image displayed by the display unit.

Further features of the present invention will become apparent from the following description of exemplary embodiments with reference to the attached drawings.

DESCRIPTION OF THE EMBODIMENTS

Figure 1:
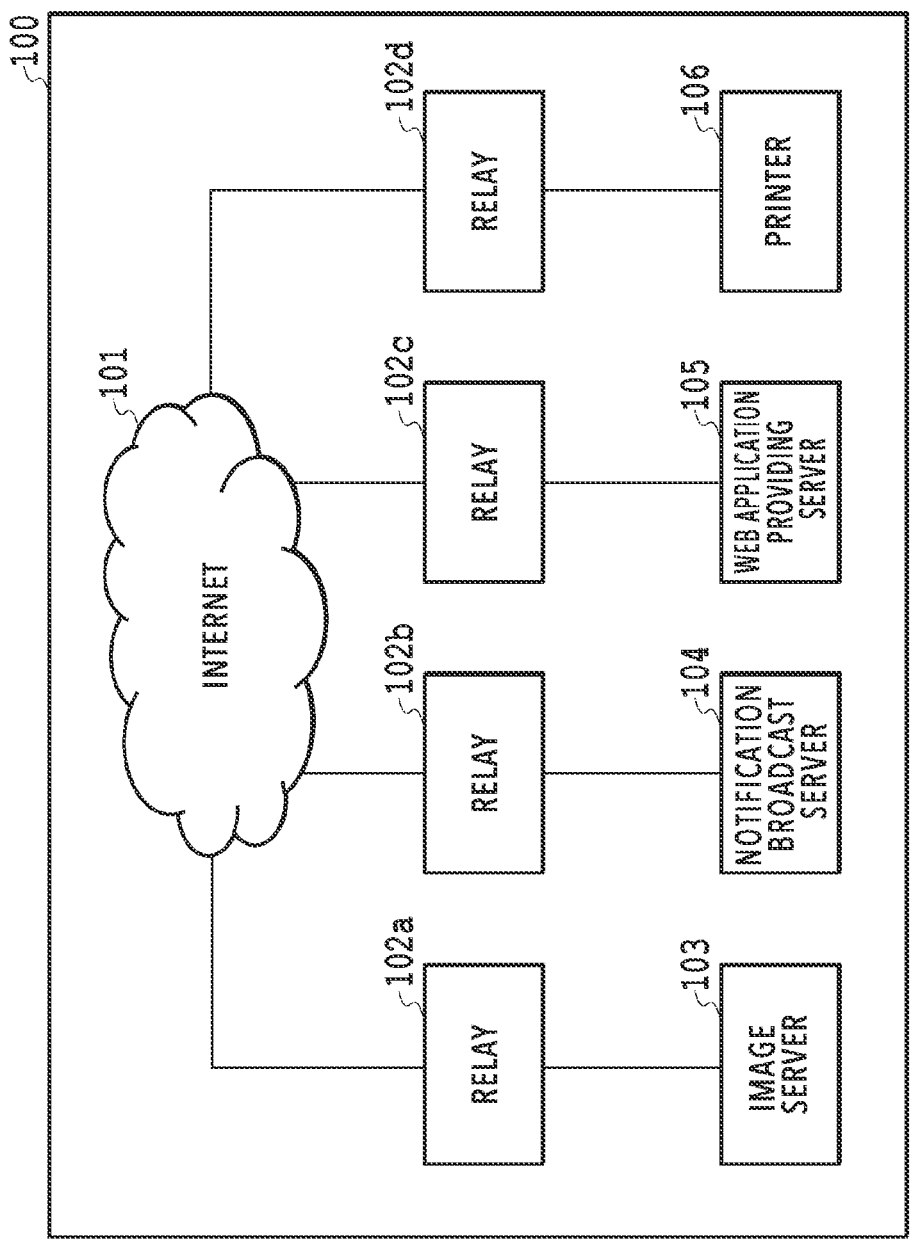
FIG. 1 is a diagram showing the configuration of an information processing system according to an embodiment of the present disclosure.

With reference to the drawings attached hereto, embodiments of the present disclosure are described in detail below. It should be noted that the following embodiments are not intended to limit the invention according to the scope of claims for patent. Although a plurality of features are described in the present embodiments, not all the features are necessarily essential to the invention, and the features may be combined in any way. Also, in the drawings attached hereto, the same or like configurations are denoted by the same reference numeral to avoid repetitive descriptions.

(Overall Configuration)

FIG. 1 shows the configuration of an information processing system according to an embodiment of the present disclosure. In an information processing system 100, a plurality of relays 102a to 102d, an image server 103, a notification broadcast server 104, a web application providing server 105, and a printer 106 are connected via the Internet 101. The relays 102 include abridge, a hub, a router, a wireless LAN access point, and the like. Although the printer 106 is shown as an example in the present embodiment, an apparatus that receives a notification may be any information processing apparatus equipped with a communication function and a display function. Also, the image server 103, the notification broadcast server 104, and the web application providing server 105 may be one server apparatus or a server system formed by a plurality of server apparatuses.

Various kinds of information are stored in the notification broadcast server 104, including advertisement information to be broadcasted to information processing apparatuses such as the printer 106, maintenance information related to maintenance, and operational information for providing information by cooperating with other server apparatuses. It is assumed here that content such as advertisement information is broadcasted by "push" where the content is broadcasted according to a preset broadcasting program, while notification information is broadcasted in response to a request from an information processing apparatus such as the printer 106. Notification information is transmitted from the notification broadcast server 104 to the printer 106 in a case where the printer 106 is ready for communication via the Internet 101 and permits communicate with the notification broadcast server 104. Descriptions of notification information and what is transmitted will be described later.

The printer 106 can obtain an image from the image server 103 based on information included in notification information. Also, based on information included in notification information, the printer 106 can request the web application providing server 105 to execute a web application program (hereinafter referred to as a web application).

Communications between the printer 106, the web application providing server 105, the notification broadcast server 104, and the image server 103 are performed by appropriately selecting a data link connecting the plurality of relays 102 in the form of a mesh. The mesh-form data links among the relays 102 are collectively expressed as the Internet 101.

Figure 2:
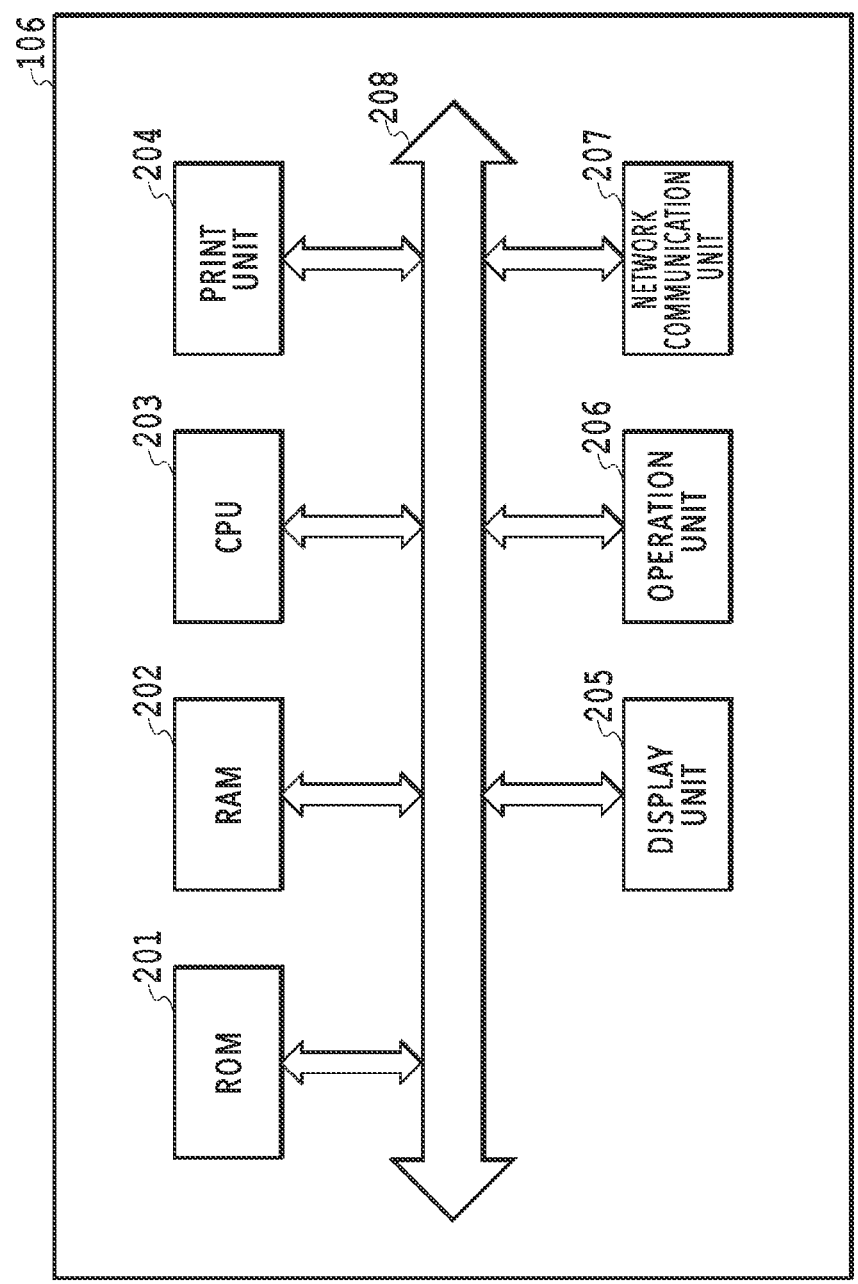
FIG. 2 is a configuration diagram showing the configuration of a printer according to an embodiment of the present disclosure.

FIG. 2 shows the configuration of the printer according to an embodiment of the present disclosure. In the printer 106, a ROM 201, a RAM 202, a CPU 203, a print unit 204, a display unit 205, an operation unit 206, and a network communication unit 207 are connected to one another via a system bus 208.

The ROM 201 has stored therein fixed data such as control programs executed by the CPU 203, data tables, and an OS program. In the present embodiments, each control program stored in the ROM 201 executes and controls software such as scheduling, task switching, interrupt handling under the control of the built-in OS stored in the ROM 201.

The RAM 202 is formed by a DRAM or the like that requires a backup power supply. The RAM 202 is used as main memory and work memory of the CPU 203, and stores therein information received by the network communication unit 207 from the servers.

The CPU 203 is a system control unit and is a central processing unit for controlling the units in the printer 106.

Based on information stored in the ROM 201 or the RAM 202 and a print job received from a PC or the like via the network communication unit 207, the print unit 204 forms an image on a printing medium such as paper using a printing material such as ink, and outputs a print result.

The display unit 205 is formed by a display device such as a light-emitting diode (LED) or a liquid crystal display (LCD) and displays various kinds of data related to image formation or printing, the mode of the printer 106, information received via the network communication unit 207, and the like.

The operation unit 206 is formed by a switch, a hard key, or the like for a user to perform various input operations. Also, in a case where the display unit 205 has a touch panel function, the display unit 205 may function as an operation unit used to perform input operations and the like.

The network communication unit 207 is connected to a network such as the Internet or a local area network (LAN), and communicates with other apparatuses such as a PC and servers.

Figure 3:
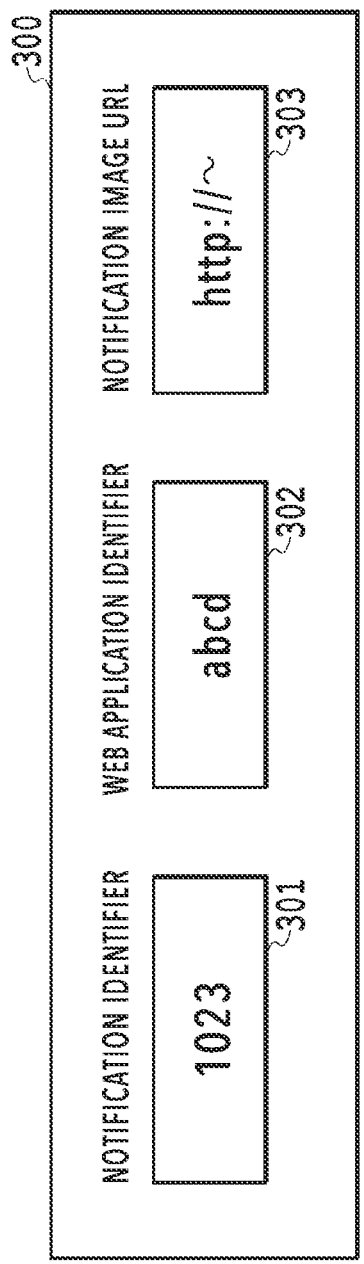
FIG. 3 is a diagram showing the configuration of notification information in the information processing system of the present embodiment.

FIG. 3 shows the configuration of notification information in the information processing system of the present embodiment. In an example case described in the present embodiments, using notification information, an image related to a web application is presented to a user, and the user executes the web application. Notification information 300 broadcasted from the notification broadcast server 104 includes the following pieces of identification information: an identifier 301 for uniquely identifying the notification information, an identifier 302 for identifying a web application provided by the web application providing server 105, and a URL 303 indicating the storage location of an image provided by the image server 103. In the present embodiments, these pieces of identification information are uniquely associated to provide a particular web application to a user.

Note that besides execution of a web application, various functions can be allocated as user usable functions, such as a function executable by operating the printer 106, a function related to maintenance, and a function provided by an external service provider. For example, instead of the identifier 302 for identifying a web application, an identifier for identifying a function of the printer 106, a URL for identifying an external service provider, or the like may be included.

In the present embodiments, the information processing apparatus communicates with a server system formed by one or more server apparatuses and receives notification information. In response to a user input with respect to an object included in a content image obtained using notification information, the information processing apparatus executes a function associated with the object. In this way, various functions can be provided to a user.

First Embodiment

Figure 4:
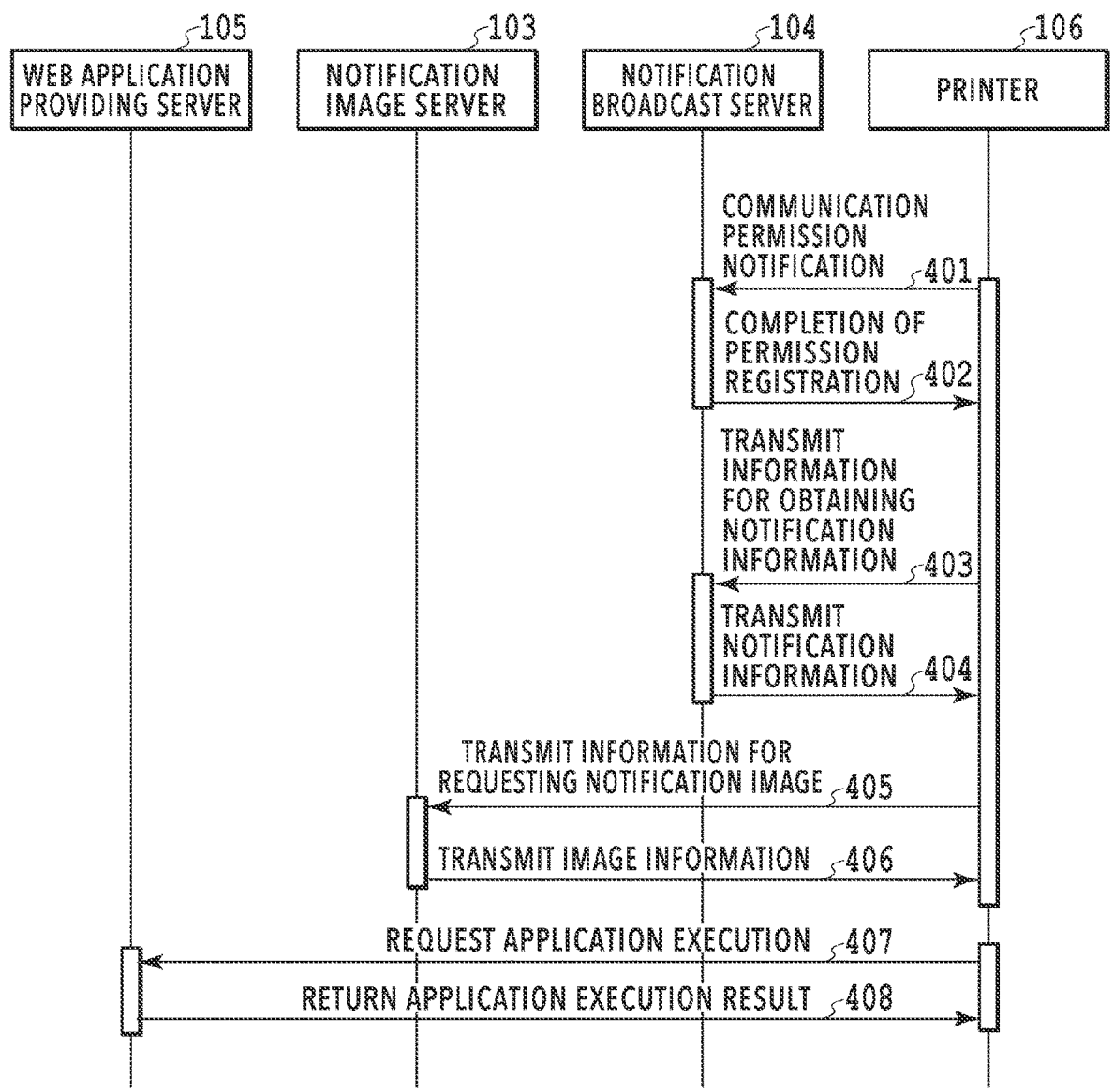
FIG. 4 is a diagram showing a sequence of communication in an information processing system according to a first embodiment of the present disclosure.

FIG. 4 shows a sequence of communication in an information processing system according to a first embodiment of the present disclosure. Discussed here is an example where the printer 106 provides a web application to a user by utilizing notification information received from the notification broadcast server 104.

Once the printer 106 is ready to communicate via the Internet 101 through the network communication unit 207, the printer 106 accesses the notification broadcast server 104 using a URL pre-registered (recorded) in the printer 106. Next, the printer 106 transmits a communication permission notification to the notification broadcast server 104 to permit communications with the notification broadcast server 104 (Step 401).

Upon receipt of the communication permission notification, the notification broadcast server 104 registers, in the notification broadcast server 104 itself, the fact that the communications with the printer 106 are permitted. After completing the registration, the notification broadcast server 104 transmits, to the printer 106, information indicating that the permission registration has been completed (Step 402).

Triggered by a lapse of a predetermined period or by a particular event, the printer 106 transmits information for obtaining notification information to the notification broadcast server 104 (Step 403).

Upon receipt of the information for obtaining notification information, the notification broadcast server 104 selects, from pieces of notification information stored therein, notification information 300 to be broadcasted to the printer 106 and transmits the selected notification information 300 to the printer 106 (Step 404). Upon receipt of the notification information 300, the printer 106 executes notification processing to notify of a message according to the notification information 300 received.

In the present embodiment, the message notified by the notification information 300 is, for example, an advertisement of a printing material (such as ink or toner) or a printing medium (such as paper) used by the printer 106 for printing (image formation). Also, the message notified is a message related to a web application usable by the printer 106. The web application usable by the printer 106 is, for example, a web application that can provide image or document content to the printer 106 and have the printer 106 print the image or document content. Also, the content related to a web application usable by the printer 106 is, for example, a content notifying of addition of a new web application usable by the printer 106, a content prompting a user to use the web application, or the like.

Note that the timing at which the notification broadcast server 104 identifies notification information as information to be broadcasted to the printer 106 is not limited to a particular timing. The timing may be, for example, the timing at which a new web application usable by the printer 106 is added, the timing of detection that the printer 106 has not used the web application for a predetermined period of time, or the timing of a lapse of a predetermined period. The following describes a case where notification information is received to notify of a content related to a web application usable by the printer 106. The notification information 300 includes, in addition to the identifier 301 of the notification information, the identifier 302 for identifying the web application and the URL 303 indicating the storage location of an image.

Upon receipt of the notification information 300, the printer 106 transmits information for requesting the image server 103 for a notification image, using the URL 303 included in the notification information 300 (Step 405).

The image server 103 transmits a content image stored in the storage area corresponding to the URL 303 to the printer 106 (Step 406). This image includes information for introducing the web application corresponding to the identifier 302 identifying the web application. The content image also includes an execution button as an object used by a user to execute the web application.

Triggered by a lapse of a predetermined period or by a particular event, the printer 106 displays the content image on the display unit 205.

Figure 10A:
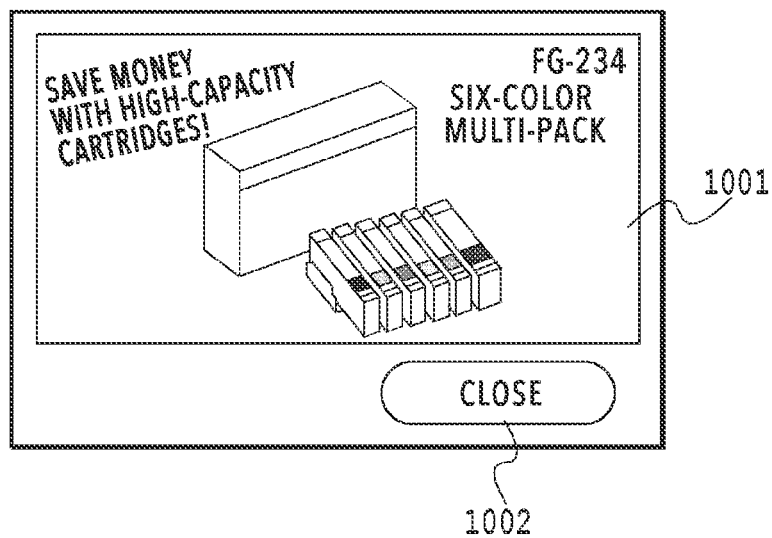
FIGS. 10A to 10C are diagrams each showing an example screen based on notification information.
Figure 10B:
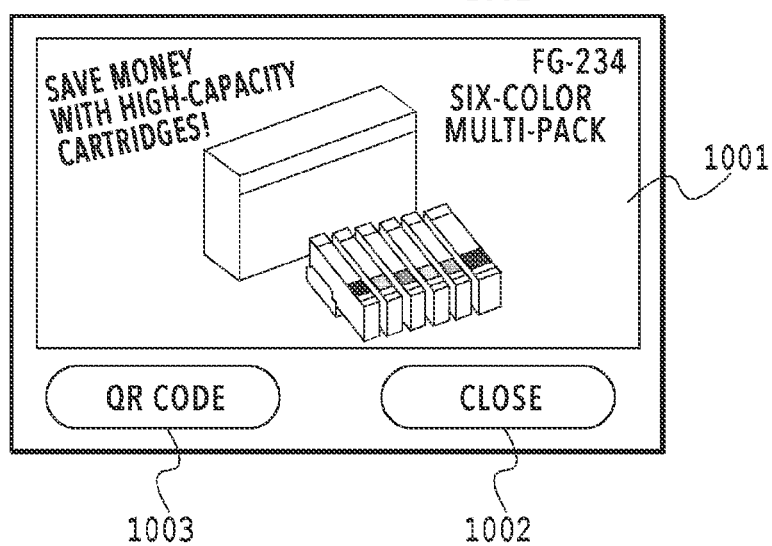
Figure 10C:
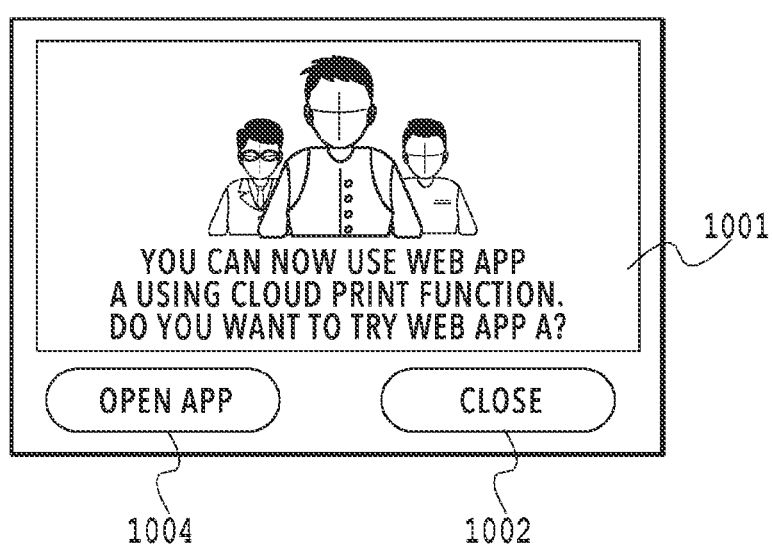

FIGS. 10A to 10C are each an example screen based on the notification information 300 which is displayed on the display unit 205. FIG. 10A is a screen displayed in a case where a message notified by the notification information 300 is an advertisement for a printing material used by the printer 106 for printing. The screen of FIG. 10A displays a region 1001 showing an advertisement message using image data and a button 1002 for stopping the display of the screen. For example, as shown in FIG. 10B, the screen may include a button 1003 for displaying a QR code (registered trademark) for allowing a terminal device to obtain a URL to go to the sales website for purchasing the advertised product.

FIG. 10C is a screen displayed in a case where a content notified by the notification information 300 is a content related to a web application usable by the printer 106. In this mode, a content notifying of addition of a new web application usable by the printer 106 or a content prompting a user to use the web application is displayed in the region 1001. For example, an icon or the like corresponding to the web application may be displayed. In the present embodiment, the screen further includes a button 1004 for activating the web application corresponding to the message displayed in the region 1001. This screen can thus prompt a user to execute a web application by displaying a content image on the display unit 205 at the time of, for example, executing a print job received from a PC or the like.

Once a user presses the button 1004 via the operation unit 206, web application activation processing is performed.

The web application activation processing is, in other words, processing to display a web application screen on the printer 106. Specifically, the printer 106 accesses the web application providing server 105 using a URL pre-registered (stored) in the printer 106. Then, the web application providing server 105 activates a web application corresponding to the user account of the user of the printer 106. Note that the above URL may be included in the notification information 300.

Note that in order for the printer 106 to access the web application providing server 105 to activate a web application, authentication information for accessing the web application providing server 105, e.g., an ID and a password, is necessary. In a case where the printer 106 has authentication information because a user has inputted the authentication information to the printer 106 before, the printer 106 activates an Internet browser and transmits the authentication information to the web application providing server 105. This allows the printer 106 to be logged in to the web application providing server 105. In this state, the printer 106 transmits a web application execution request to the web application providing server 105 along with the identifier 302 for identifying the web application (Step 407). Note that a description will be given later of operation performed in a case where the printer 106 does not have authentication information because a user has not inputted authentication information to the printer 106 before.

Although a button for activating a web application is described here as an example of an object included in an image, a different object can be displayed as described earlier, depending on the function usable by the user. As described earlier, in a case of a function executable by operating the printer 106, for example, a print setting button may be displayed, and in response to a user pressing the print setting button, a print setting function can be executed using the identifier for identifying the function in the printer 106.

The web application providing server 105 executes the web application based on the web application identifier 302. In response to an HTTP request, a web application is implemented by execution of an API installed in the web application providing server 105 using a web API. The web application providing server 105 then transmits an execution result to the printer 106, the execution result being display information for displaying what is being executed in the web application by the web application providing server 105 (Step 408). Specifically, the web application providing server 105 transmits the execution result as an HTTP response, and the printer 106 displays a screen based on the execution result on the Internet browser displayed on the display unit 205.

According to the first embodiment, a web application can be executed directly from notification information displayed on the information processing apparatus. Thus, user operations can be simplified, which enables improvement in convenience.

Figure 5:
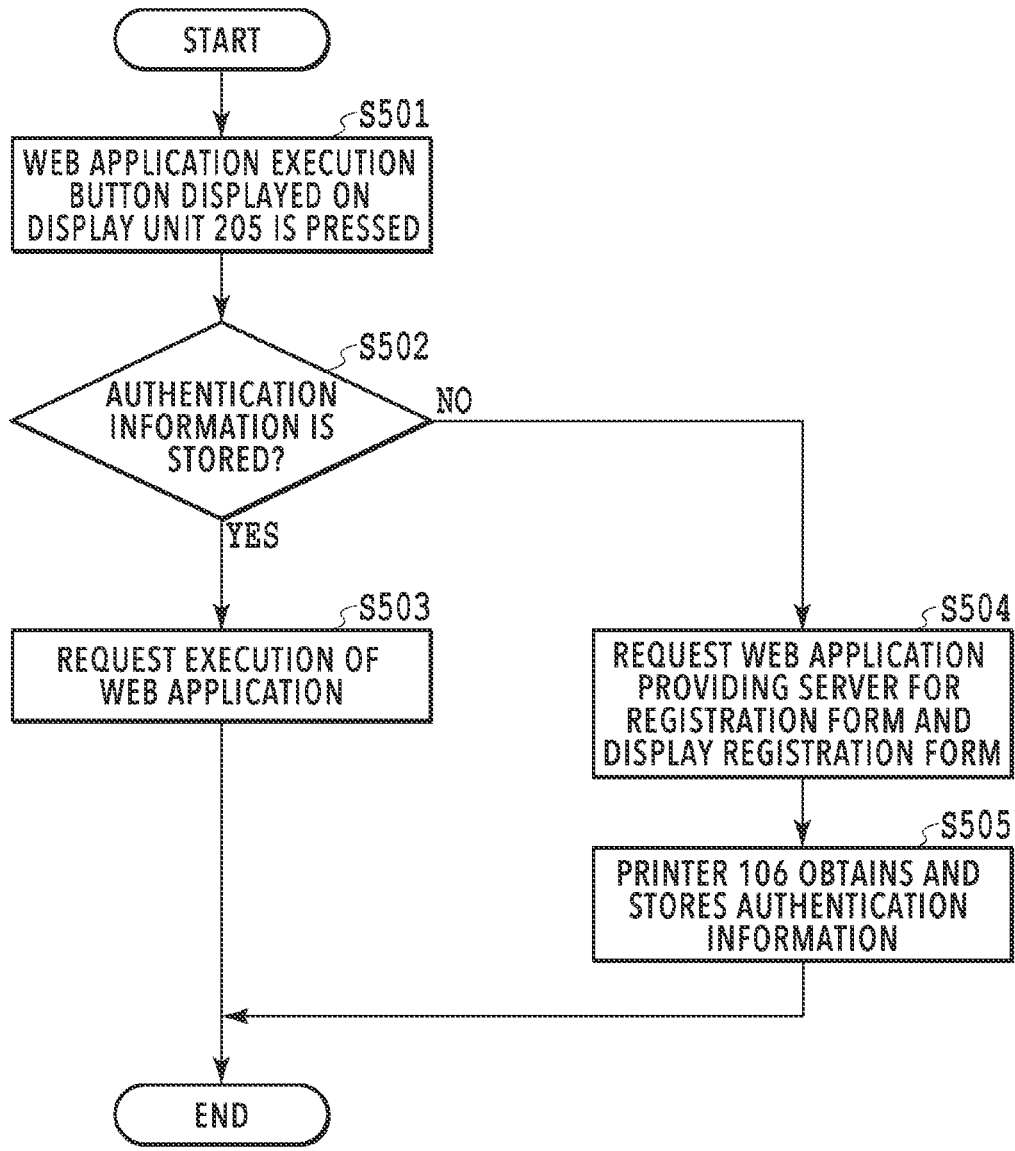
FIG. 5 is a flowchart of processing executed by a printer displaying a screen based on notification information.

FIG. 5 shows a flowchart of processing executed by the printer 106 displaying a screen based on the notification information 300. This is a flowchart of operation including a case where the printer 106 obtains authentication information for accessing the web application providing server 105 from the web application providing server 105. Note that each step in the following flowchart is denoted by a step "S."

Once a user presses an execution button on an image displayed on the display unit 205 of the printer 106, the printer 106 accesses the web application providing server 105 using an URL pre-registered (stored) in the printer 106 (S501).

In a case where the web application providing server 105 is requesting authentication information (an ID and a password) for a login to the web application providing server 105, the printer 106 determines whether the authentication information is stored in the printer 106 (S502).

If it is determined that the authentication information is stored, the printer 106 activates the Internet browser and transmits the authentication information stored in the printer 106 to the web application providing server 105. With the printer 106 being logged in to the web application providing server 105, the printer 106 transmits a web application execution request along with the identifier 302 for identifying the web application (S503). After the execution request is transmitted, the web application providing server 105 executes a web application. Also, the printer 106 receives information for displaying a screen showing what is being executed in the web application by the web application providing server 105. Specifically, for example, a list of images stored in the web application is displayed. Once a user selects an image from the list on the printer 106, the printer 106 can receive the selected image from the web application and print the received image.

If it is determined that the authentication information is not stored, the printer 106 requests the web application providing server 105 for a registration form (S504). For example, the registration form includes information related to registration into the web application providing server 105 and a registration button as an object for registration. Once the printer 106 receives the registration form, the registration form is displayed on the display unit 205 of the printer 106.

In response to the user pressing the registration button via the operation unit 206, the printer 106 transmits an authentication information issue request to the web application providing server 105. Then, upon receipt of the authentication information issue request, the web application providing server 105 transmits authentication information. Upon receipt of the authentication information, the printer 106 stores the authentication information in the printer 106 (S505). Then, the next time an access to the web application providing server 105 is made, the determination result in S502 will be YES. After that, for example, based on information received from the web application providing server 105, the printer 106 displays a selection screen for selecting a web application executable by the web application providing server 105. By selecting a web application on the selection screen, a user transmits a web application execution request along with an identifier for identifying the selected web application.

Note that the web application may be performed not by the web application providing server 105, but by, for example, a server different from the web application providing server 105. In that case, a web application execution instruction is transmitted to the different server via the web application providing server 105. Also, the information for displaying a screen showing what is being executed in the web application by the different server is transmitted from the different server to the printer 106 via the web application providing server 105. In this event, a screen for logging in to the different server is displayed on the printer 106, and in a case where a login to the different server is successfully done based on information inputted on the screen, for example, a list of images that the different server has can be displayed on the printer 106.

Second Embodiment

Figure 6:
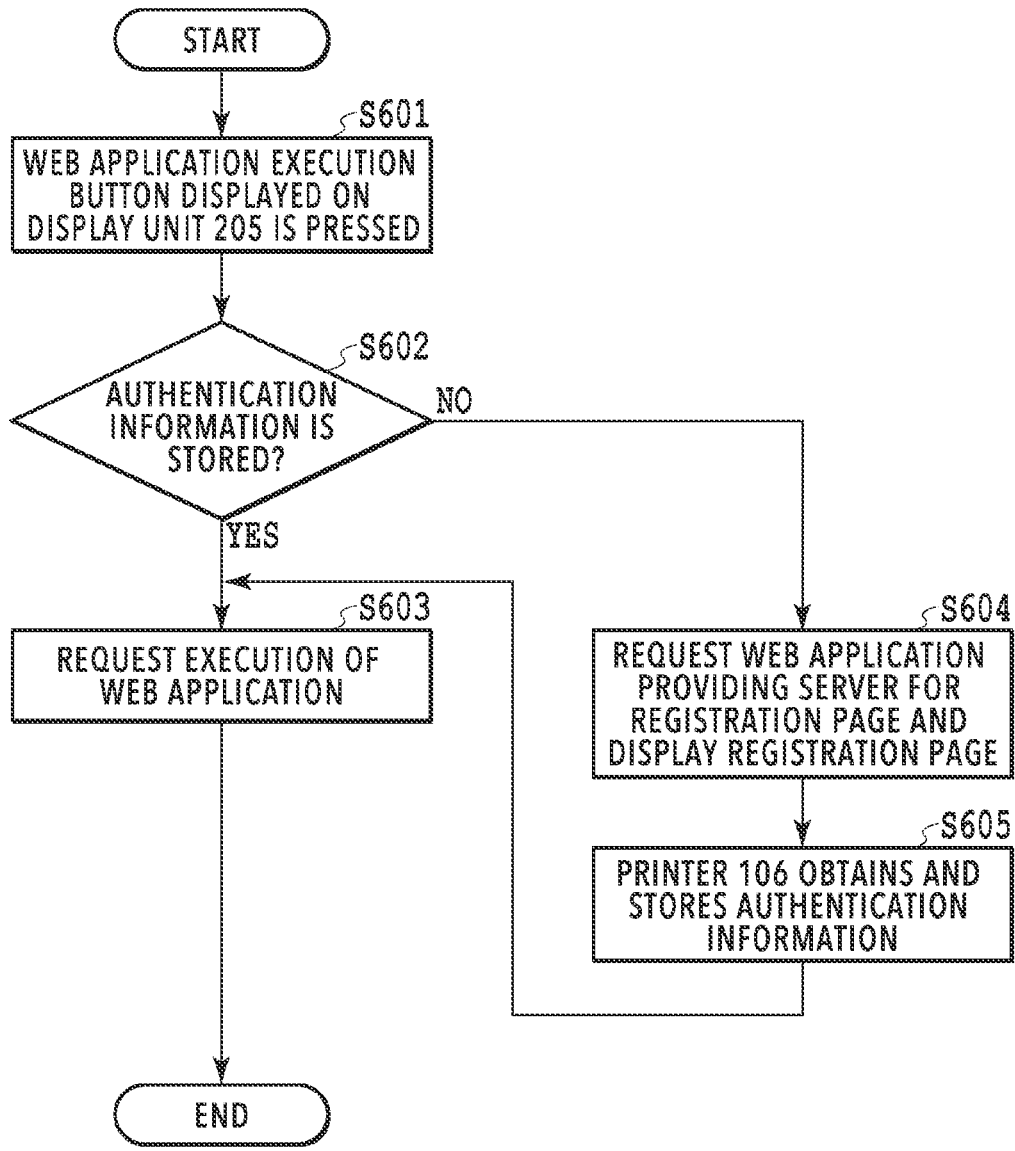
FIG. 6 is a flowchart of processing executed by a printer displaying a screen based on notification information.

FIG. 6 shows a flowchart in an information processing system according to a second embodiment of the present disclosure. The processing shown in FIG. 6 is a mode replacing the processing shown in FIG. 5 of the first embodiment. Like the first embodiment, this is a flowchart of operation including a case where the printer 106 obtains authentication information for accessing the web application providing server 105 from the web application providing server 105. The embodiment also covers execution of a web application.

Processing from S601 to S605 is the same as that from S501 to S505. Although a selection screen is displayed after S505 in the mode described in the first embodiment, in the second embodiment, S603 is executed after S605. Specifically, a registration page received from the web application providing server 105 in S604 includes a registration execution button. In response to a user pressing the registration execution button via operation unit 206, a request for executing the web application notified on the notification screen is transmitted, instead of the web application being selected.

In this way, in the second embodiment, required registration to the web application providing server 105 in advance is automatically performed, and then activation and execution of the web application are performed, which saves a user from having to perform an operation and therefore improves convenience.

Third Embodiment

Figure 7:
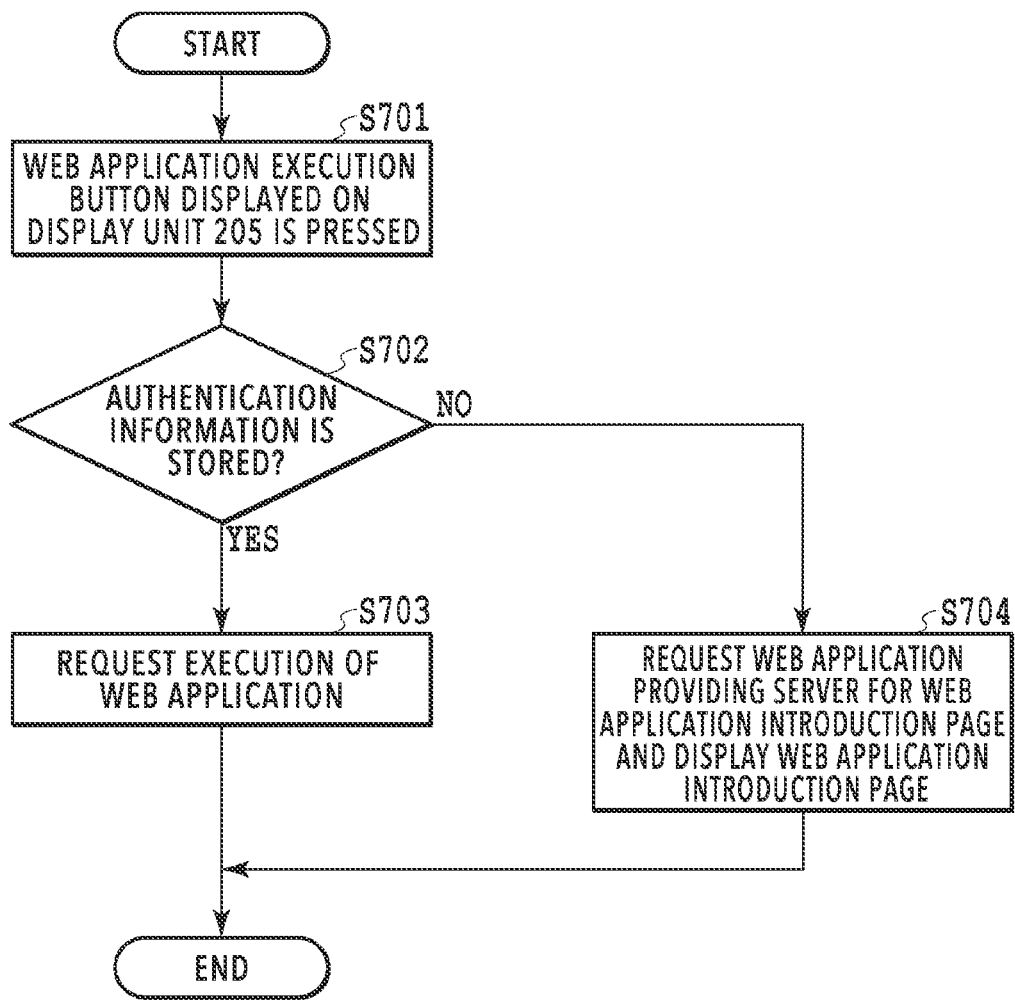
FIG. 7 is a flowchart of processing executed by a printer displaying a screen based on notification information.

FIG. 7 shows a flowchart in an information processing system according to a third embodiment of the present disclosure and shows a flowchart of operation of a different function executed in a case where the printer 106 does not have authentication information for accessing the web application providing server 105. The processing shown in FIG. 7 is a mode replacing the processing shown in FIG. 5 of the first embodiment. Processing from S701 to S703 is the same as that from S501 to S503.

If it is determined in S702 that authentication information is not stored, the printer 106 requests the web application providing server 105 for a web application introduction page and displays the web application introduction page on the display unit 205. For example, the web application introduction page may include a detailed description such as a procedure of executing the web application notified by the notification information 300. In addition, the web application introduction page may present an indication that registration to the web application providing server 105 is required in order to execute the web application. It is also possible to present, for example, a registration page request button for displaying the registration page described in the second embodiment.

Fourth Embodiment

In the modes described in the above embodiments, the information processing apparatus executes the activation of a web application. Alternatively, a communication terminal such as a smartphone may read identification information such as a URL or a QR code displayed on the display unit 205 of the printer 106, activate a particular application in the smartphone, access the web application providing server 105, and execute the web application.

Figure 8:
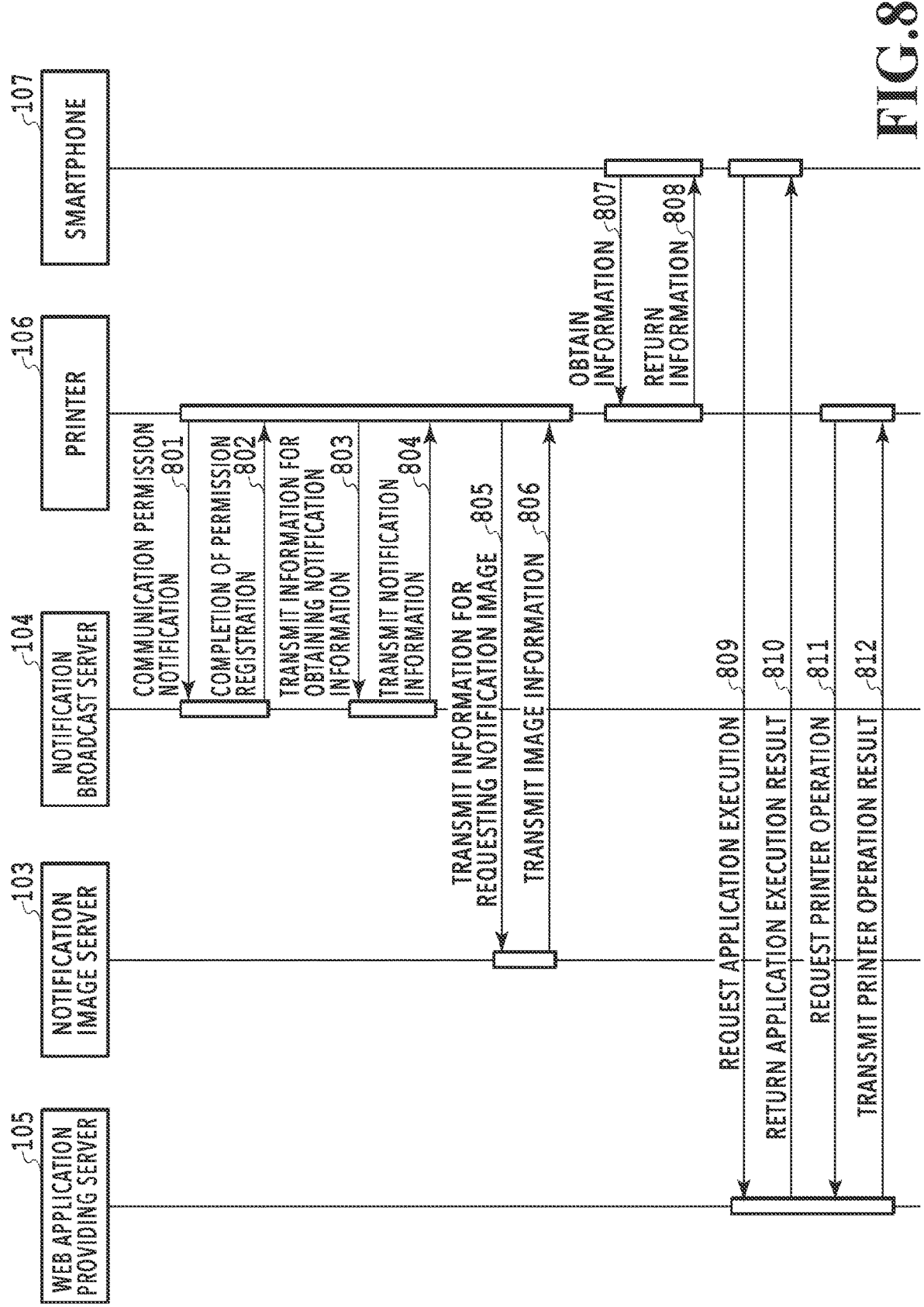
FIG. 8 is a diagram showing a sequence of communication in an information processing system according to a fourth embodiment of the present disclosure.

FIG. 8 shows a sequence of communication in an information processing system according to a fourth embodiment of the present disclosure. Once the printer 106 is ready to communicate via the Internet 101 through the network communication unit 207, the printer 106 accesses the notification broadcast server 104 using an URL preregistered in the printer 106. Next, the printer 106 transmits a communication permission notification to the notification broadcast server 104 to permit communications with the notification broadcast server 104 (Step 801).

Upon receipt of the communication permission notification, the notification broadcast server 104 registers, in the notification broadcast server 104 itself, the fact that the communications with the printer 106 are permitted. After completing the registration, the notification broadcast server 104 transmits, to the printer 106, information indicating that the permission registration has been completed (Step 802).

Triggered by a lapse of a predetermined period or by a particular event, the printer 106 transmits information for obtaining notification information to the notification broadcast server 104 (Step 803).

Upon receipt of the information for obtaining notification information, the notification broadcast server 104 selects, from pieces of notification information stored therein, notification information 300 to be broadcasted to the printer 106 and transmits the selected notification information 300 to the printer 106 (Step 804). The notification information 300 includes, in addition to the identifier 301 of the notification information, the identifier 302 for identifying the web application and the URL 303 indicating the storage location of an image.

Upon receipt of the notification information 300, the printer 106 transmits information for requesting the image server 103 for a notification image, using the URL 303 included in the notification information 300 (Step 805).

The image server 103 transmits a content image stored in the storage area corresponding to the URL 303 to the printer 106 (Step 806). This image includes information for introducing the web application corresponding to the identifier 302 identifying the web application. The content image also includes an execution button as an object used by a user to execute the web application. In addition to the execution button, the image further includes an object such as a QR code, which is displayed on the display unit 205 of the printer 106.

Triggered by a lapse of a predetermined period or by a particular event, the printer 106 displays the content image on the display unit 205. For example, in a case of executing a print job received from a PC or the like, the content image may be displayed on the display unit 205 to prompt a user to execute the web application.

While the content image is displayed on the display unit 205, the user reads an identification code image such as a QR code using an external communication terminal such as a smartphone 107 (Step 807). Then, the image thus obtained from the image server 103 may be transmitted to the smartphone 107 as is or after being processed into an image suitable for the display unit of the smartphone 107 (Step 808).

A particular application is activated in the smartphone, and the smartphone accesses the web application providing server 105 using a pre-registered URL from an Internet browser. Next, the smartphone 107 transmits a web application execution request to the web application providing server 105 along with the identifier 302 for identifying the web application (Step 809).

The execution of the web application is performed between the smartphone and the web application providing server 105, and the smartphone performs operations such as, for example, editing a background image to be printed on printing paper. The web application providing server 105 transmits the execution result to the smartphone 107 (Step 810).

In a case where the web application execution result is requesting the printer 106 to execute printing, scanning, or the like, the following processing is performed. Specifically, an operation request based on the web application execution result is transmitted from the web application providing server 105 to the printer 106 (Step 811). For example, an operation request is transmitted to the printer 106 as a print command for, for example, printing a background image edited on the smartphone onto printing paper. After executing the requested processing, the printer 106 transmits an execution result to the web application providing server 105 (Step 812).

According to the fourth embodiment, a communication terminal such as a smartphone can execute a web application using notification information displayed on the information processing apparatus. This offers more operation options for a user and thus can improve convenience even more.

Fifth Embodiment

Figure 9:
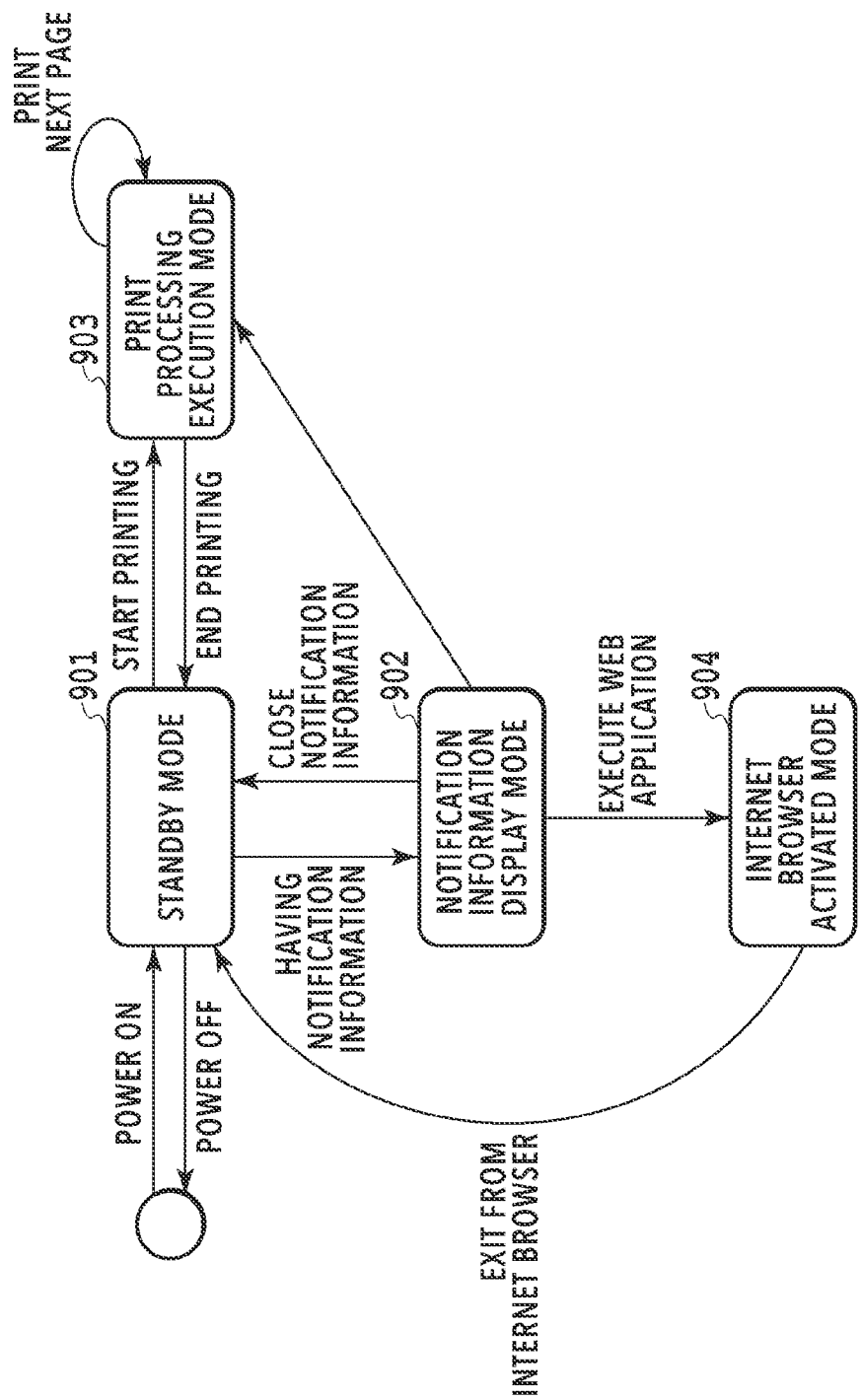
FIG. 9 is a diagram showing a change in mode of an information processing apparatus according to a fifth embodiment of the present disclosure.

FIG. 9 shows a diagram showing a change in mode of an information processing apparatus according to a fifth embodiment of the present disclosure. The printer 106 as an information processing apparatus changes into standby mode (901) upon power on. In a case of having been notified of notification information 300 by the notification broadcast server 104 and having received a content image based on the URL 303 for the notification image in standby mode, the printer 106 changes into notification information display mode (902). For example, the information is notification information previously received before power off, information on a content image not displayed on the display unit 205 of the printer 106, information indicating that a user is not executing a web application, or the like.

Once a user executes a web application, the printer 106 is brought to Internet browser activated mode (904). Once the Internet browser is exited or once the display of the notification information is closed in the notification information display mode, the printer 106 changes into the standby mode.

In a case where printing is executed in the standby mode, the printer 106 changes into printing mode (903). Upon completion of printing processing, the printer 106 changes from printing mode to standby mode.

Also, a condition for displaying notification information can be added to the notification information 300. One or more conditions of conditions for changing into standby mode are added as a display condition. Notification information can be displayed again in a case where, for example, an Internet browser is exited or the printer 106 changes into standby mode after completion of printing processing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, various functions can be used by utilization of a content image displayed on an operation screen.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-137498, filed Aug. 25, 2021 which is hereby incorporated by reference wherein in its entirety.

What is claimed is:

1. An information processing apparatus comprising:
a reception unit configured to receive notification information, which includes information with respect to a new available web application, from a server system, the server system being formed by one or more server apparatuses;
an obtainment unit configured to obtain screen information of a user interface screen from the server system based on information with respect to a storage location of the user interface screen which includes a first code image to access the web application, the storage location of the user interface screen being included in the received notification information, and to obtain, if the received notification information includes first information of a storage location where an image is stored, the image from the server system based on the information of the storage location;
a display unit configured to display a first screen that includes both of the obtained image and a first object if the received notification information includes both of the first information of the storage location and second information of a web application and further if a predetermined period elapses or a particular event occurs, the displayed first object being an object which is used for obtaining authentication information and is used for activating the web application corresponding to the second information, and the first screen being different from a screen provided by the web application, and display a second screen that includes the first screen and the first code image if the received notification information includes the screen information of the user interface screen and further if a predetermined period elapses or a particular event occurs; and
an execution unit configured to
after (i) the first code image on the second screen is read by an external apparatus, (ii) the web application is executed by the external apparatus, and (iii) a processing, which performs printing of an image edited by the external apparatus on a printing sheet and is requested by the web application in the external apparatus, is transmitted to the information processing apparatus, execute the processing which performs printing the image, which is transmitted by the web application in the external apparatus, on the printing sheet,
receive a user operation for selecting the first object included in the displayed first screen,
confirm whether the authentication information is included in the notification information,
request, in a case where the authentication information is not included in the notification information, a registration form for inputting information to the server system,
transmit, in a case of receiving user input with respect to the information via the registration form, an issue request including the information to the server system for causing the server system to issue the authentication information,
store, in a case of obtaining the authentication information issued by the server system in response to the transmitted issue request, the obtained authentication information, and
transmit the authentication information and an execution request along with the second information to the server system for causing the server system to execute the web application corresponding to the second information,
wherein, in a case where the received notification information includes advertisements of a printing medium and a printing material, the display unit displays a second user interface screen including a second code image which is different from the first code image; and
whereby, in a case where the second code image is read by the external apparatus, the external apparatus can access a website for purchasing the printing medium and the printing material.

2. The information processing apparatus according to claim 1, wherein
the displayed first object is a button object used for activating the web application.

3. The information processing apparatus according to claim 1, wherein
in a case where the authentication information for being provided with the web application is not stored in the information processing apparatus, the obtainment unit obtains the notification information from the server system, the obtained notification information includes information for introducing the web application.

4. The information processing apparatus according to claim 1, wherein
the display unit displays, if the notification information includes the first information of the storage location and an identification code for executing the web application, a second screen that includes the obtained image and the identification code,
wherein an external communication terminal transmits an execution request to the server system for executing the web application when the external communication terminal reads the identification code displayed on the second screen, and wherein the information processing apparatus obtains an execution result of the web application executed by the server system.

5. The information processing apparatus according to claim 1, wherein
the display unit displays the image after the information processing apparatus changes into standby mode.

6. An information processing method comprising:
receiving notification information, which includes information with respect to a new available web application, from a server system, the server system being formed by one or more server apparatuses;
obtaining screen information of a user interface screen from the server system based on information with respect to a storage location of the user interface screen which includes a first code image to access the web application, the storage location of the user interface screen being included in the received notification information, and obtaining, if the received notification information includes first information of a storage location where an image is stored, the image from the server system based on the information of the storage location;
displaying a first screen that includes both of the obtained image and a first object if the received notification information includes both of the first information of the storage location and second information of a web application and further if a predetermined period elapses or a particular event occurs, the displayed first object being an object which is used for obtaining authentication information and is used for activating the web application corresponding to the second information, and the first screen being different from a screen provided by the web application, and displaying a second screen that includes the first screen and the first code image if the received notification information includes the screen information of the user interface screen and further if a predetermined period elapses or a particular event occurs;
after (i) the first code image on the second screen is read by an external apparatus, (ii) the web application is executed by the external apparatus, and (iii) a processing, which performs printing an image edited by the external apparatus on a printing sheet and is requested by the web application in the external apparatus, is transmitted to the information processing apparatus, executing the processing which performs printing the image, which is transmitted by the web application in the external apparatus, on the printing sheet;
receiving a user operation for selecting the first object included in the displayed first screen;
confirming whether the authentication information is included in the notification information;
requesting, in a case where the authentication information is not included in the notification information, a registration form for inputting information to the server system;
transmitting, in a case of receiving user input with respect to the information via the registration form, an issue request including the information to the server system for causing the server system to issue the authentication information;
storing, in a case of obtaining the authentication information issued by the server system in response to the transmitted issue request, the obtained authentication information; and
transmitting the authentication information and an execution request along with the second information to the server system for causing the server system to execute the web application corresponding to the second information,
wherein, in a case where the received notification information includes advertisements of a printing medium and a printing material, a second user interface screen including a second code image which is different from the first code image is displayed; and
whereby, in a case where the second code image is read by the external apparatus, the external apparatus can access a website for purchasing the printing medium and the printing material.

7. A non-transitory computer readable storage medium storing a program for causing a computer to perform an information processing method of using various functions, the method comprising:
receiving notification information, which includes information with respect to a new available web application, from a server system, the server system being formed by one or more server apparatuses;
obtaining screen information of a user interface screen from the server system based on information with respect to a storage location of the user interface screen which includes a first code image to access the web application, the storage location of the user interface screen being included in the received notification information, and obtaining, if the received notification information includes first information of a storage location where an image is stored, the image from the server system based on the information of the storage location;
displaying a first screen that includes both of the obtained image and a first object if the received notification information includes both of the first information of the storage location and second information of a web application and further if a predetermined period elapses or a particular event occurs, the displayed first object being an object which is used for obtaining authentication information and is used for activating the web application corresponding to the second information, and the first screen being different from a screen provided by the web application, and displaying a second screen that includes the first screen and the first code image if the received notification information includes the screen information of the user interface screen and further if a predetermined period elapses or a particular event occurs;
after (i) the first code image on the second screen is read by an external apparatus, (ii) the web application is executed by the external apparatus, and (iii) a processing, which performs printing an image edited by the external apparatus on a printing sheet and is requested by the web application in the external apparatus, is transmitted to the information processing apparatus, executing the processing which performs printing the image, which is transmitted by the web application in the external apparatus, on the printing sheet;
receiving a user operation for selecting the first object included in the displayed first screen;
confirming whether the authentication information is included in the notification information;

requesting, in a case where the authentication information is not included in the notification information, a registration form for inputting information to the server system;

transmitting, in a case of receiving user input with respect to the information via the registration form, an issue request including the information to the server system for causing the server system to issue the authentication information;

storing, in a case of obtaining the authentication information issued by the server system in response to the transmitted issue request, the obtained authentication information; and transmitting the authentication information and an execution request along with the second information to the server system for causing the server system to execute the web application corresponding to the second information, wherein, in a case where the received notification information includes advertisements of a printing medium and a printing material, a second user interface screen including a second code image which is different from the first code image is displayed; and whereby, in a case where the second code image is read by the external apparatus, the external apparatus can access a website for purchasing the printing medium and the printing material.

* * * * *